US010457225B2

(12) United States Patent
Guigner et al.

(10) Patent No.: US 10,457,225 B2
(45) Date of Patent: Oct. 29, 2019

(54) LIGHT WEIGHT ACOUSTIC TRIM PART

(71) Applicant: AUTONEUM MANAGEMENT AG, Winterthur (CH)

(72) Inventors: Delphine Guigner, Winterthur (CH); Vipul Savaliya, Woodstock (CA); Marco Seppi, Altstatten (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 239 days.

(21) Appl. No.: 15/522,491

(22) PCT Filed: Oct. 26, 2015

(86) PCT No.: PCT/EP2015/074690
§ 371 (c)(1),
(2) Date: Apr. 27, 2017

(87) PCT Pub. No.: WO2016/066565
PCT Pub. Date: May 6, 2016

(65) Prior Publication Data
US 2017/0361785 A1 Dec. 21, 2017

(30) Foreign Application Priority Data
Oct. 30, 2014 (EP) .................................... 14191183

(51) Int. Cl.
*B60R 13/08* (2006.01)
*G10K 11/168* (2006.01)

(52) U.S. Cl.
CPC ............ *B60R 13/083* (2013.01); *B60R 13/08* (2013.01); *B60R 13/0838* (2013.01); *B60R 13/0861* (2013.01); *G10K 11/168* (2013.01)

(58) Field of Classification Search
CPC ... B60R 13/083; B60R 13/08; B60R 13/0838; B60R 13/0861
(Continued)

(56) References Cited

U.S. PATENT DOCUMENTS 5,567,922 A * 10/1996 Schmuck ................ B60R 13/08
181/284
5,824,973 A * 10/1998 Haines ...................... B32B 5/22
181/286

(Continued)

FOREIGN PATENT DOCUMENTS

EP 1 736 357 A1 12/2006
EP 1 847 383 A1 10/2007
(Continued)

OTHER PUBLICATIONS

International Search Report and Written Opinion prepared by the European Patent Office dated Feb. 4, 2016, for International Application No. PCT/EP2015/074052.
(Continued)

*Primary Examiner* — Jeremy A Luks
(74) *Attorney, Agent, or Firm* — Lewis Brisbois Bisgaard & Smith LLP; Craig Mueller

(57) ABSTRACT

Multilayer sound attenuating trim part for a vehicle, in particularly for a trim part or cladding used in the interior of a car, for instance as an inner dash or as part of the floor covering or for the exterior of a vehicle, for instance as a trim part or cladding in the engine bay area or as part of an under body trim part as well as to the method of producing a part, comprising at least two fibrous layers (10, 30) and at least one air permeable intermediate film layer (20) between the at least two fibrous layers, whereby all layers together have a variable thickness.

29 Claims, 1 Drawing Sheet

(58) Field of Classification Search
USPC ........ 181/204, 205, 284, 286, 290, 294, 295
See application file for complete search history.

(56) References Cited

U.S. PATENT DOCUMENTS

| | | | |
|---|---|---|---|
| 6,296,075 B1* | 10/2001 | Gish | B60R 13/083 181/290 |
| 7,137,477 B2 | 11/2006 | Keller | |
| 7,322,440 B2* | 1/2008 | Khan | B32B 5/18 181/286 |
| 7,980,358 B2* | 7/2011 | Soltau | G10K 11/168 181/204 |
| 8,393,438 B2* | 3/2013 | Ogawa | B32B 5/26 181/286 |
| 8,418,806 B1* | 4/2013 | Wyerman | G10K 11/002 181/284 |
| 9,637,068 B2* | 5/2017 | Rondeau | B32B 3/263 |
| 9,805,708 B2* | 10/2017 | Kim | D04H 1/4374 |
| 10,144,367 B2* | 12/2018 | Borchardt | B60R 13/0815 |
| 2003/0066708 A1* | 4/2003 | Allison | B32B 5/18 181/290 |
| 2003/0124314 A1* | 7/2003 | Michael | B32B 3/28 428/156 |
| 2004/0131836 A1* | 7/2004 | Thompson | B01D 53/228 428/304.4 |
| 2004/0231915 A1 | 11/2004 | Thompson et al. | |
| 2006/0090958 A1* | 5/2006 | Coates | G10K 11/162 181/290 |
| 2006/0237130 A1* | 10/2006 | Thompson | B01D 53/228 156/273.3 |
| 2007/0178794 A1 | 8/2007 | Nishio et al. | |
| 2007/0190876 A1 | 8/2007 | Ogawa et al. | |
| 2007/0202302 A1* | 8/2007 | Matsuura | B32B 3/085 428/174 |
| 2009/0250292 A1* | 10/2009 | Hayasaka | B60R 13/0815 181/290 |
| 2009/0298374 A1* | 12/2009 | Delmas | B32B 7/08 442/374 |
| 2011/0221223 A1 | 9/2011 | Mizata | |
| 2011/0293892 A1* | 12/2011 | Ogawa | B32B 5/26 428/172 |
| 2016/0300561 A1* | 10/2016 | Kim | B60R 13/08 |

FOREIGN PATENT DOCUMENTS

| | | |
|---|---|---|
| EP | 2 363 325 A1 | 9/2011 |
| EP | 2398674 B1 | 5/2013 |
| FR | 2821789 | 12/2003 |
| FR | 2873620 | 7/2004 |
| FR | 2891865 | 7/2005 |
| GB | 2 419 831 A | 5/2006 |
| JP | H01-314769 A | 2/1996 |
| JP | 2000-511244 A | 8/2000 |
| JP | 2002-316332 A | 10/2002 |
| JP | 2006-137160 A | 6/2006 |
| JP | 2007-203919 A | 8/2007 |
| JP | 2010-535295 A | 11/2010 |
| WO | 97/45581 A | 12/1997 |
| WO | 2005/082563 A1 | 9/2005 |
| WO | 2009017908 A1 | 2/2009 |

OTHER PUBLICATIONS

Dictionary of Chemistry 8. Published Sep. 20, 1977.
Dictionary of Plastic/Functional polymer materials, Published on Feb. 20, 2004, as 1st edition.
Translation of Information Statement from related JP2017-523467. Mar. 27, 2019. 23 pages.
Handbook of Technical Textiles. Horrocks et al. 2000. 677 pages.
Generalized Light-Weight Concepts: Improving the Acoustic Performance of Less than 2500 g/m2 Insulators. Duval et al. 2009. 10 pages.
Propagation of Sound in Porous Media. Modelling Sound Absorbing Materials. Allard et al. 2009. 374 pages.
Opposition documents filed in related EP3015314. 34 pages.

* cited by examiner

LIGHT WEIGHT ACOUSTIC TRIM PART

CROSS REFERENCE TO RELATED APPLICATIONS

This application is a national stage application under 35 U.S.C. 371 and claims the benefit of PCT Application No. PCT/EP2015/074690 having an international filing date of 26 Oct. 2015, which designated the United States, which PCT application claimed the benefit of European Patent Application No. 14191183.4 filed 30 Oct. 2014, the disclosure of each of which are incorporated herein by reference.

TECHNICAL FIELD

The invention relates to a multilayer sound attenuating trim part for a vehicle, in particularly a trim part or cladding used for the interior of a vehicle, for instance as inner dash or as part of the floor covering or for the exterior of a vehicle, for instance as trim part or cladding in the engine bay area or as part of an under body trim component as well as to the method of producing such part.

BACKGROUND ART

Sound attenuation is an important factor in the design of a car. For sound attenuation fibrous materials are used in mass spring acoustic systems as well as in single or multilayer absorbing systems.

The choice of a particular sound insulating material for a given application is determined not only by its ability to attenuate sound but by other considerations as well. These include cost, weight, thickness, fire resistance, etc. Well-known sound attenuating materials include felts, foams, compressed fibers felt materials, glass wool or rock wool, and recycled fabrics including shoddy materials.

For instance U.S. Pat. No. 5,298,694 discloses an acoustical insulating web to be used as an absorbing layer, comprising melt-blown microfibers and crimped bulking fibers in a weight ratio of about 40:60 to about 95:5. The crimped bulking fibers disclosed are mechanically crimped fibers or thermally crimped fibers. These types of crimp are mainly used to aid the production process of the fibrous material felt layer, however they do not have a prolonged effect on the product performance during use.

EP 934180A discloses a multilayer acoustic trim part with at least two layers whereby the top layer is compressed to form a micro porous stiffening layer having a total airflow resistance of between $Rt=500$ $Nsm^{-3}$ to $Rt=2500$ $Nsm^{-3}$ and an area weight of between 0.3 $kg/m^2$ and 2.0 $kg/m^2$.

For the parts described in this and similar patents as well as found in cars, the layers are normally formed together to obtain an overall multilayer construction. One way to produce a layer which is part of the multilayer is to distribute the fibers in such a way that the area weight (mass per unit area) of the layer remains constant. In this case, if the layers are put together on top of each other through the forming process, the overall area weight of the multilayer is still constant, while the overall density of the multilayer is varying from point to point. In particular, in areas where the layers are compressed to obtain a lower thickness on the part, the overall density is higher than in areas where the layers are less compressed to fill a space with higher thickness. For this reason and for this type of parts, high overall density of the multilayer is generally associated to low thickness and low overall density of the multilayer is generally associated to high thickness.

It is estimated that up to 30% of the total area of parts forming the state of the art is not contributing to the sound absorption of such parts due to local areas with high density at low thickness rendering the product near to impervious to air in those areas of the part.

The estimation of 30% weak areas comes from analysis of typical packaging space, i.e. available volume to be filled by acoustic parts in a vehicle. For such parts, the range of thicknesses is generally between 5 and 60 mm, but the distribution of thickness and the extreme values can vary between different cars and parts. For typical dash inner acoustic parts that are in majority of absorptive type, the thickness distribution found is roughly as follows: with a thickness distribution below 7.5 mm 19%, with a thickness distribution between 7.5 and 12.5 mm 27%, with a thickness distribution between 12.5 and 17.5 mm 16%, with a thickness distribution between 17.5 and 22.5 mm 13%, with a thickness distribution between 22.5 and 27.5 mm 20%, and with a thickness distribution above 27.5 mm 5%.

These data show that the thicknesses below 12.5 mm highly contribute to the overall area of the part (about 45%). In these areas, the material is heavily compressed and this has a negative impact on the acoustic performance, in particular for thicknesses below about 8 mm. The location of part of these low thickness areas is at the edges and around the cut-outs and therefore less important, however a good part of the 45% is strongly contributing to the performance. For these considerations, it is estimated that roughly 30% of the area of a typical part has characteristics which are especially critical for the overall performance. Another important issue is that currently used fibrous material is unable to achieve sufficient thickness at low density to address part thickness requirements. Therefore weight is added to obtain the required thickness, however at the cost of the increasing overall weight of the part. Adding weight has in turn a negative effect on the acoustic performance of the lower thickness areas where the material is heavily compressed. Not only the packaging space available is relatively limited and influencing the performance of the part, but in addition the increase of weight limits even more the performance in these areas. Overall, due to the material currently used and the problem just described, approximately up to 30% of the area is minimally or not contributing to its' overall acoustic performance.

It is therefore the object of the current invention to further optimize the multilayer absorbing products of the state of the art, in particular to further optimize the overall acoustic performance of the part.

SUMMARY OF INVENTION

The objective is obtained by a multilayer automotive trim part for noise attenuation comprising at least 2 fibrous layers and at least one air permeable intermediate film layer between the at least 2 fibrous layers with the features of main claim 1 or 2. In particular whereby all layers have a variable thickness characterized in that at least for an area where the thickness is between 4 and 12.5 mm, the overall air flow resistance ($AFR_{overall}$) and the overall density 0 relate as follows $1500 < AFR_{overall} - 10\bar{\varrho} < 3800$ with $AFR_{overall}$ in $Nsm^{-3}$ and $\bar{\varrho}$ in $kg/m^3$ or at least for an area where the overall density is above 250 $kg/m^3$ the overall air flow resistance ($AFR_{overall}$) and the overall density $\bar{\varrho}$ relate as follows $1500 < AFR_{overall} - 10\bar{\varrho} < 3800$ with $AFR_{overall}$ in $Nsm^{-3}$ and $\bar{\varrho}$ in $kg/m^3$.

The relations of $AFR_{overall} = 10^* \bar{\varrho}^{+1500}$ and $AFR_{overall} = 10^* \bar{\varrho}^{+3800}$ represent respectively the minimum and the maximum optimal value of the overall AFR as function of the overall density. The optimal overall AFR for three dimensional (3D) multilayer parts is between these two boundaries.

For a state of the art part sample, the overall AFR increases with overall density and above a certain value, estimated to be around 220 kg/m$^3$, the multilayer is essentially closed (AFR measurement above 8000 N·s·m$^{-3}$). For samples according to the invention, the multilayer remains open also for high densities, thus ensuring an optimal acoustic performance.

For state of the art part samples the overall AFR would only fit for a limited density range within the given relationships between overall AFR and overall density, while the samples of parts according to the invention would fit over the whole range of densities, in particularly for overall densities above 200 kg/m$^3$, more preferably above 230 kg/m$^3$, however not higher than 500 kg/m$^3$. This means that at least for the part area with a thickness of between 4 mm and 12 mm the overall AFR would fall within the defined range and such area would then contribute to the overall acoustic absorption of the part.

Surprisingly by maintaining the relation between the overall air flow resistance and overall density within the range, for a thickness at least between 4 and 12 mm, preferably at least between 4 and 10 mm, it is possible to obtain a 3 dimensional shaped part with an optimized acoustic performance over almost the whole thickness profile of the part. By doing so any area with a thickness above 4 mm will contribute to noise attenuation in the vehicle, further optimizing the acoustic properties of automotive multilayer absorbing parts. At least for the thickness range of at least between 4 to 12.5 mm, preferably at least 4 to 10 mm, this is an improvement over the currently used materials and technologies as in these areas normally the material is closed or near to closed and no longer substantially contributing to the overall acoustic absorption of the part.

In addition, at low overall density, e.g. at an area with a thickness range of for instance 20-30 mm the overall AFR should not fall under the minimum optimal value as defined to further optimize the overall acoustic performance.

The overall density 0 in kg/m$^3$ of a certain portion of the part is defined as the overall mass in that portion divided by the overall volume in the same portion. Whereby the overall mass is the mass of the different layers combined and the overall volume is the volume of the different layers combined.

The overall density is calculated for the local area of the part, where the overall air flow resistance is measured. The local area of the part is cut perpendicularly to the direction of the layers, to obtain a portion of the part, on which the overall density is measured.

The relation between the density and the air flow resistance as defined and claimed is area related and therefore mixing of different locations would result in an incorrect dataset.

The overall air flow resistance (AFR) is the AFR as measured on the local area of the trim part. It is clear to a skilled person that an average over a certain small area will do as well to follow the teachings of the invention as disclosed, as the measurement for density and AFR are done on an area rather than at the level of a single point. The AFR is measured according to ISO 9053, using the direct airflow method (method A).

Due to the typical shape of the parts and to the materials used, both the overall density and the overall AFR are variable over the part's surface. In order to define the minimum area to measure those quantities, the ISO 9053 defines a minimal circular area having a diameter of 95 mm that must be used. However as the 3D shape of the parts is particularly marked in some cases, when necessary the skilled person can deviate from the limit of the norm and measure samples with a smaller circular area having a diameter of not less than 75 mm, provided that the tool for the measurement of the AFR is adapted to provide a proper airflow through such local area of the part. For such a sample, it is advised that the thickness variation over the sample's surface is kept within a range of around 20%. For example it is acceptable to measure a sample having a thickness of 5 mm with local deviation between 4 and 6 mm (and not outside this range), or a sample having a thickness of 10 mm with local deviations of between 8 and 12 mm (and not outside this range). Otherwise due to the shape of the part, for example due to lack of perfect planarity, and due to variability of the material, the measurements would not be meaningful. For example the AFR would be linked to a limited area of the sample where the thickness is lower compared to the average thickness of the sample and therefore would not be representative of the complete sample.

The same sample taken from a local area of the part should be used for the AFR and the density measurements.

Air-permeable is defined as having an air flow resistance under 8000 N·s·rn$^{-3}$ for sake of simplicity. Air impermeable is defined as having an air flow resistance equal to or above 8000 N·s·rn$^{-3}$. Above 8000 N·s·rn$^{-3}$ the air flow resistance that might exist is at least insufficient to have a major impact on the acoustic absorbing performance of the part.

In an embodiment the trim part is made with at least 2 fibrous layers, and an intermediate film layer whereby at least one of the fibrous layers is a mixture of fibers consisting of 10 to 40% by weight of binder fibers, 10 to 70% by weight of recycled fibers and 10 to 70% by weight of self-crimped fibers.

In another embodiment the trim part is made with at least 2 fibrous layers and an intermediate film layer whereby at least one of the fibrous layers is a mixture of fibers comprising of 10 to 40% by weight of binder fibers and 10 to 70% by weight of recycled fibers. Preferably 10 to 70% by weight of synthetic fibers might be included in this layer.

Surprisingly the combination of material in at least one of the fibrous layers according to the embodiments further optimizes the acoustic performance. It enables to reduce weight and still obtain the variable thickness needed for this type of automotive trim parts, normally in the range of between 4 and 30 mm, preferably up to 35 mm. However depending on material of the at least one layer up to 40-50 mm total thickness can be achieved, for instance with at least one layer containing self-crimped fibers.

The top fibrous layer, the layer facing away from the source of noise, for instance the body in white, has preferably an area weight of between 250 and 1800 gsm (grams per square meter), preferably between 400 and 1000 gsm. Preferably the thickness of the top layer is between 1 and 10 mm in the final trim part. Preferably this layer has a more constant thickness.

The second layer facing towards the source of noise, for instance the body in white, has preferably an area weight of between 250 and 1500 gsm, more preferably between 300 and 800 gsm.

Preferably the thickness of the second layer is between 2 and 60 mm in the final trim part. The overall area weight of the at least 2 fibrous layers is preferably between 800 and 2500 gsm, preferably between 1000 and 2000 gsm.

In particular by the combination of the materials as claimed, it is possible to obtain the higher thicknesses required to fill the packaging space and surprisingly the area with the lower thicknesses still shows acoustic absorption, thereby increasing the area with effective acoustic absorbing properties to almost 100%. With the materials according to the invention an increase in initial thickness at reduced density could be achieved, therefore a reduction in weight at same thickness can be achieved. This is an advantage for the car maker as the part becomes lighter in weight, having a direct positive effect on the fuel consumption and the $CO_2$ footprint of the car.

Surprisingly the initial resilience of the material is kept mainly intact during the production and even during prolonged use of the material. This is beneficial as the trim parts or cladding made with the material are normally in the car throughout their lifetime, the product will therefore maintain its initial performance longer.

The air-permeable intermediate film layer is either a single layer film or a multilayer film. The film may be cast or blown film preferably. The intermediate film layer preferably has a weight per square meter of between 5 and 100 gsm, more preferably between 8 and 50 gsm, even more preferably between 8 and 40 gsm.

The film can be made from at least one of the following polymers: copolymer or polymer of acetate, like Ethylene Vinyl Acetate (EVA), copolymers of acrylate for instance Ethylene Acrylic Acid (EAA), a polyolefin for instance a polyethylene (PE) based polymer, like linear density polyethylene (LDPE), linear long density polyethylene (LLDPE) or a metallocene linear long density polyethylene (mLLDPE) or derivatives, or a multilayer film, preferably a combination of a polyethylene based copolymer film covered with an adhesive EAA layer at least at one side.

The intermediate layer is air-permeable at least in the final product, enhancing the overall air flow resistance of the trim part. Depending on the process chosen for laminating the layers and molding the final part the film might be air permeable from the beginning, or might become air permeable during the production of the part. If the film is made air permeable in a separate production step, it should be chosen such that the film enhances the overall air flow resistance of the part.

A preferred process is opening the film layer during the molding of the trim part using steam pressure to obtain an air permeable layer with an air flow resistance that is beneficial for the overall acoustic performance of the part. By opening the film during the final production step of the trim part the AFR properties of the film may be tuned to the required needs.

Preferably the intermediate layer is the layer with the highest air flow resistance.

Preferably the air flow resistance of the thin intermediate layer is between 500 and 2500 $N \cdot s \cdot m^{-3}$ in the final product independent of the process chosen.

The air permeable intermediate layer can alternatively be one of a nonwoven scrim, a hot melt layer, a gluing web or adhesive layer that after molding has the same level of air flow resistance as would be achieved with the film material.

In some cases, the second layer can be peeled off from the overall construction, while the first layer and the intermediate layer are more difficult to separate.

Preferably the air flow resistance of the top layer and the intermediate layer together represents at least 55% of the total AFR of the complete multilayer, preferably between 65% and 80% of the total AFR of the complete multilayer.

The trim part comprises at least 2 fibrous layers of which at least one of the layers is made from a mixture of fibers consisting of 10 to 40% b weight of binder fibers, 10 to 70% by weight of recycled fibers and 10 to 70% by weight of self-crimped fibers.

The other layer preferably comprises at least a mixture of 10 to 40% binder fibers and 10 to 90% recycled fibers. However this layer might also benefit from added self-crimped fibers or synthetic fibers.

Self-crimped fibers are fibers with two sides, arranged such that one side has shrinked differently from the other side and thereby induced a shaping of the filament away from the straight line, for instance in the form of spiral, omega or helical. However in most cases the shape is not necessarily a regular structure: irregular 3 dimensionally shaped versions are having the same advantage.

Self-crimped fibers can be made by exploiting morphology differences across the fiber either by utilizing the inherent morphology differences of two different polymers or by creating a morphology difference in a homopolymer by means of additives or process manipulation. Methods to achieve this include but are not limited to bicomponent technologies such as side by side and eccentric sheath core, which exploits molecular weight and/or stereochemistry differences of each component. Similar effects can be achieved by manipulating other melt spinning process variables (i.e. melt viscosity) that cause a differential in the orientation level across the fiber diameter, while using a homopolymer. Additionally, polymer additives like cross linkers or branching agents could also be used to create a similar effect.

A pre-requisite for self-crimping is a certain crimping potential created by differences in shrinkage, shrinking power and modulus of elasticity of the two fiber components. A mechanical crimp might be used to further enhance the fiber crimp and the shape formed, for instance by including a stuffer box treatment or a saw tooth gear treatment.

Self-crimped fibers differ from mechanically crimped fibers in a way that they obtain the crimping capacity during the spinning of the fiber as an intrinsic feature of the fiber. This intrinsic self-crimp is less likely to be lost during further production process steps or later use of the material. The crimp in self-crimped fibers is permanent.

The advantages of using a self-crimped fiber rather than a mechanically crimped fiber are manifold. For the invention as disclosed the most important advantages are that the fiber is in the crimped status from the beginning of the production of the fibrous layers. The crimped status in the form of a randomly 3-dimensional shaped fiber is the preferred status of the fiber. Surprisingly, the fiber stays in this preferred shape during the whole production as well as during the lifetime of the trim part. Mechanically crimp on its own is less strong and will lose its' properties over time. Mechanically crimped fibers will flatten out over time, losing the resilience and loftiness, making the trim part to fail over time in its purpose.

The self-crimped fiber is preferably a side by side conjugate fiber. Preferably the conjugate material is chosen such that there is a difference in viscosity causing an inherent self-crimping in the fiber. However other types of conjugate fibers that show a self-crimping as defined might be chosen as well.

Fibers that have a crimping potential that is induced later by an additional process for instance an heating step, are defined as having latent crimp. This crimp can also be obtained by the same type of differences as previously disclosed. Preferably the self-crimped fibers are in their final crimped status, and no further crimping is induced by later processes. To have the crimped status from the beginning of the production of the automotive trim part, shows a better mixing of the fibers, a more homogenous fibrous mat after carding or airlay, and less crimp of the fibrous mat during molding therefore the blank size can be estimated more precisely. While inducing crimp during thermal molding of the trim part, would result in a heavy crimp of the fibrous mat, causing a movement of the fibers during molding, which might result in faults in the final part. Depending on the 3D shape of the trim part, there is no benefit in a too late initiation of the shrinkage of the fibers.

Overall the use of the self-crimped fibers enhances the evenness of the material layer obtained by for instance carding methods or more preferred air laying methods. The natural tendency of the self-crimped fibers to go back to a random curled form gives the fibers an additional resilience. In particularly the shoddy material is not clumping again during processing and is better spread throughout the layer.

Surprisingly the material as claimed can be thermoformed more precisely in a 3D shape and in addition the resilience of the material is not substantially reduced during molding, showing that the fibers are less prone to deterioration during the molding process of the actual part. In addition, the material keeps its resilience during use, ergo the initial thickness obtained directly after molding is maintained longer.

Preferably, the self-crimped fibers are made of one or a combination of: polyamide (nylon) preferably polyamide 6 or polyamide 6,6, in short PA; polyester and or its copolymers, for instance polyethylene terephthalate in short PET; polybutylene terephthalate, in short PBT, or polyolefin, for instance polypropylene, (PP) or polyethylene (PE) or a combination of a polymer and its copolymer as mentioned, for instance a combination of polyethylene terephthalate and copolyethylene terephthalate PET/CoPET. The use of polyesters is most preferred as they have a good record of recycling. The polymers used can be virgin or coming from recycled resources, as long as the material requirements are given.

Preferably the self-crimped fibers have an overall round cross section, more preferably with a hollow core, also known as hollow conjugate fibers. However, other cross-sections known in the art to make conjugate self-crimped fibers can be used as well.

The synthetic fibers of one of the embodiments might have a circular cross section, preferably hollow, or other cross section beneficial to the overall bulkiness of the fibrous material. For instance a hollow hexagonal cross section, or a hollow winged cross section. Other cross-sections might work as well.

Both the synthetic and self-crimped fibers might have 2 or multiple hollow cavities in the length direction of the fiber.

The 2 sides, components or polymers should be distributed in the filament string such that a difference in shrinkage is given. The maximum crimp may be developed when the fibers are comprised of equal parts of each component and the components were separated and located on opposite sides of the fiber.

The staple fiber length of self-crimped fibers used is preferably between 32 and 76 mm. The fiber is preferably between 2 and 20 dtex, more preferably between 2 and 10 dtex.

The binder fibers for any of the fibrous layers can be one of a mono-component fiber or bi-component fiber made with at least one of the following materials, polyester, in particularly polyethylene terephthalate, polyolefins, in particularly Polypropylene or polyethylene, polylactic acid (PLA) or polyamide (PA) in particularly polyamide 6 or polyamide 6.6. The binder fibers are preferably between 10 and 40% by weight of the total fibers for any of the fibrous layers.

The recycling fibers are preferably shoddy cotton, shoddy synthetic, shoddy polyester or shoddy natural fibers, whereby the shoddy type is defined by having at least 51% by weight of the material included, 49% can be fibers from other sources. So for instance, a shoddy polyester contains at least 51% by weight of polyester based materials. Alternatively, the shoddy material can be a mixture of different synthetic and natural fibers, whereby not one type is prevailing.

The fibrous layer not including the crimped fibers or the layer facing towards the source of noise, might include other natural or synthetic types of fibers common in the industry, for instance wool, abaca, polyolefin, for instance polypropylene or polyethylene, or polyester, for instance polyethylene-terephthalate (PET) or a mixture of such fibers. This layer might also include ultrafine fibers in the range from 0.5 to 2 dtex.

Preferably the fibrous layers are having the same or similar mixture of fibers.

The at least 2 fibrous layers may be compressed differently to form layers with different properties. They may differ in at least one of: stiffness, density, air flow resistance or fiber mixture, or a combination of these properties, to further optimize the absorbing properties of the trim part.

In a preferred embodiment the trim part is to be placed in a car to cover a vehicle panel to reduce noise. The side of the trim part that is facing in the direction of the passenger compartment, away from the vehicle panel (the top fibrous layer), may have a higher stiffness than the side that is facing in the direction of the vehicle panel (the second fibrous layer). This side is preferable following the body in white and has loftier properties.

Preferably, the at least 2 fibrous layers and the intermediate film layer together have an overall density of between 20 and 460 kg/m$^3$. The variable overall density can be achieved preferably by compression of the at least 2 fibrous layers and the intermediate layer during the molding of the trim part to form the required shape, resulting in a product that is overall air permeable and functions as an acoustic absorbing trim part that is light weight and keeps its structure during the lifetime of the product.

The trim part has a variable thickness. At least for the area of the part having a thickness between 4 and 12.5 mm the overall air flow resistance and overall density follows the relation $1500 < AFR_{overall} - 10\bar{e} < 3800$.

Furthermore at least for the areas with overall density of between 200 and 500 kg/m$^3$ the overall air flow resistance and overall density follow the relation $1500 < AFR_{overall} - 10\bar{e} < 3800$.

Preferably the relation is fitting the area of the part for a thickness of above 4 mm or an overall density of below 500 kg/m$^3$ and more preferably for a thickness below 25 mm or an overall density of above 20 kg/m$^3$. Thereby enabling that almost 100% of the trim part contributes to the noise attenuation, even at a reduced weight of the part.

BRIEF DESCRIPTION OF THE DRAWINGS

FIGS. 1A and 1B show schematically the set-up of the product according to the claim with the at least 2 fibrous layers 10 and 30 and the thin intermediate film layer 20. Blanks of the fibrous layers and the intermediate layer are stacked as indicated in FIG. 1A and the stack of materials is molded to form a trim part with a 3 dimensional shape shown as an example in FIG. 1B. During the molding the top and/or bottom fibrous layers are compressed and the fibers are bound to set the final shape of the part. Optionally as part of the process the intermediate film layer might become air-permeable, for instance by forming micro perforations or by the process of melting and solidifying of the material. Although layer 10 after molding is relatively constant in its final thickness, slight variations in thickness might be given. In this example, the lower layer 30 has a more pronounced 3 dimensional shape to enable a good fit to the body-in-white of the car. Preferably, at least the layer directed to the body in white of the car comprises crimped fibers as claimed. de An example of a part according to invention can be as follows:

The top layer 10 is facing away from the noise source and is made of a first fibrous layer with an area weight of 750 gsm comprising 18% of PET/CoPET bicomponent fibers as binder fibers and 82% of recycled fibers, preferably a shoddy cotton.

The air permeable intermediate layer 20 is a film layer with a weight per square meter of between 19 gsm. The film layer is made permeable during the steam molding process of the part, thereby fine tuning the air flow resistance of the film using steam pressure.

The second fibrous layer 30 is a fibrous layer with an area weight of 550 gsm consisting of 18% by weight of PET/CoPET bicomponent fibers as binder fibers and 40% by weight of PET conjugated self-crimped fibers and 42% of recycled fibers, preferably cotton shoddy. Giving an overall area weight of around 1300 gsm.

An comparative example according to the state of the art has a top layer of 18% bicomponent fibers as binder fibers and 82% of shoddy material with an area weight of 750 gsm, roughly the same film layer and a second fibrous layer of the same material as the top layer, however at 1100 gsm to compensate for thickness requirements of the trim part. As this material does not achieve the required initial thickness to fill the maximum thickness areas of the part at a lower area weight. Hence the part has a total area weight of 1850 gsm.

Figure 1A:
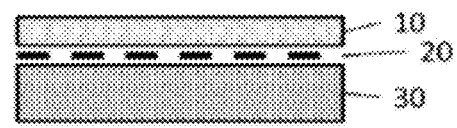
FIG. 1A is a schematic showing an exploded view of a trim part of one embodiment of the present invention.
Figure 1B:
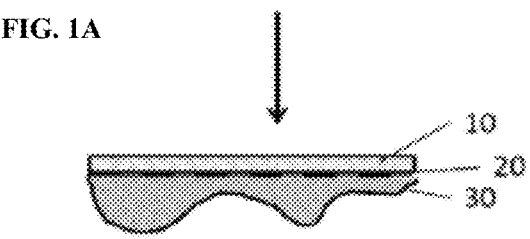
FIG. 1B is a schematic of the trim part of FIG. 1A.
Figure 2:
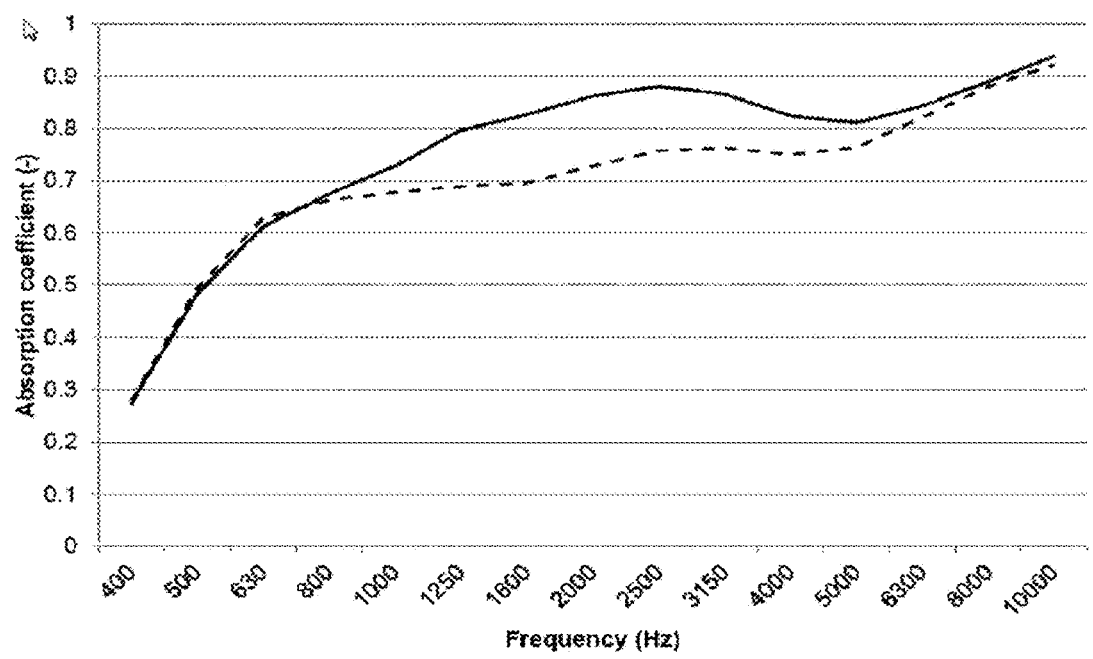
FIG. 2 shows the acoustic performance of one embodiment of the present invention.

FIG. 2 is showing a simulation of the acoustic performance for the same trim part optimized according to the invention as claimed. The absorption is based on actual measurements in an Alpha Cabin of flat samples and on the thickness distribution as mentioned in the background section. The absorption of a part according to the state of the art is shown in dotted line, while the absorption of a part according to the invention is shown in continuous line. The better acoustic performance for the part according to the invention is specifically linked to the performance in the areas of low thickness (high density) which is better for the part according to the invention because of the optimal overall AFR.

The multilayer part according to invention can be used as an interior trim part for instance as an inner-dash, or hush panel, as part of an interior flooring system, as an acoustic cladding, or as an engine bay trim part, for instance a hood liner, or outer-dash or as an outer or inner wheel arch liner.

A multilayer acoustic trim part according to the invention may further comprise additional layers such as a covering scrim layer, an acoustic scrim layer, a decorative top layer, for instance a tufted or nonwoven carpet layer. To keep the benefit of the acoustic attenuation these additional layers should be air permeable at least on the side directed to the noise source.

The Production of the Trim Part

In the following possible production processes will be explained in more detail. However, a skilled person might also be expected to know how to use alternative processes to come to a similar result.

The different fibers are blended in the advantageous combination according to the teachings of the invention and the properties needed for the specific part, such that the fibers are evenly blended throughout the material formed. The blended fibers are formed in a mat or bat, by known technologies available on the market. Preferably by using a card or garnet, which gives a more orientated fiber material or by using an airlay process, for instance using a Rando-Webber or other known air lay machine, which gives a more random laid web or mat. The thus obtained web or mat can be further processed in a continuous process. If there is a need for later processing the web or mat formed can be consolidated for instance in a thermal process step or by using needling. Needling is not preferred for the fibrous webs or mats containing the self-crimped fibers, since it has a negative impact on the loftiness and resilience of the layer obtained.

The product can be made by using hot and/or cold molding processes. An example of such a process can be a combination of preheating the material in a hot air oven followed by a cold molding step to obtain the 3D shaped trim part. Alternatively the material is heated directly in the mold for instance by a hot fluid, like hot air or steam, to obtain a consolidated part. In particular, the use of steam is preferable if the film is to be made air permeable during the molding step.

What is claimed is:

1. Multilayer Automotive trim part for noise attenuation comprising at least two fibrous layers and at least one air permeable intermediate film layer between the at least two fibrous layers, whereby all layers together have a variable thickness characterized in that at least for an area with a thickness between 4 and 12.5 mm the overall air flow resistance ($AFR_{overall}$) and the overall density $\bar{\varrho}$ relate as follows $1500 < AFR_{overall} - 10\bar{\varrho} < 3800$ with $AFR_{overall}$ in $Nsm^{-3}$ and $\bar{\varrho}$ in $kg/m^3$.

2. Multilayer Automotive trim part for noise attenuation comprising at least two fibrous layers and at least one air permeable intermediate film layer between the at least two fibrous layers, whereby all layers together have a variable thickness characterized in that at least for an area with an overall density above 250 $kg/m^3$ the overall air flow resistance ($AFR_{overall}$) and the overall density $\bar{\varrho}$ relate as follows $1500 < AFR_{overall} - 10\bar{\varrho} < 3800$ with $AFR_{overall}$ in $Nsm^{-3}$ and $\bar{\varrho}$ in $kg/m^3$.

3. Automotive trim part according to claim 1, wherein the air flow resistance of the top layer and the intermediate layer together represents at least 55% of the overall AFR of the multilayer, preferably between 65% and 80% of the overall AFR of the multilayer.

4. Automotive trim part according to claim 1, wherein the AFR of the intermediate film layer is higher than the AFR of the at least two fibrous layers.

5. Automotive trim part according claim 1, wherein at least one of the fibrous layers comprises a mixture of fibers consisting of 10 to 40% by weight of binder fibers, 10 to 70% by weight of recycled fibers, and 10 to 70% by weight of self-crimped fibers or synthetic fibers, wherein the total amount of said fibers adds to 100% by weight.

6. Automotive trim part according to claim 1, wherein at least one of the fibrous layers comprises a mixture of fibers consisting of 10 to 40% by weight of binder fibers, 10 to 70% by weight of recycled fibers, wherein the total amount of said fibers adds to 100% by weight.

7. A multilayer acoustic trim part according to claim 1, wherein the air permeable intermediate film layer is one of a single layer film or a multilayer film.

8. A multilayer acoustic trim part according claim 7, wherein the film is made with at least one of the following polymers: copolymer or polymer of acetate, like Ethylene Vinyl Acetate (EVA), copolymers of acrylate for instance Ethylene Acrylic Acid (EAA), a polyolefin for instance a polyethylene (PE) based polymer, like linear density polyethylene (LDPE), linear long density polyethylene (LLDPE) or a metallocene linear long density polyethylene (mLL-DPE) or derivatives, or a multilayer film, preferably a combination of a polyethylene based copolymer film covered with an adhesive EAA layer at least at one side.

9. A multilayer acoustic trim part according to claim 1, wherein the film is replaced by one of: a nonwoven scrim, a hot melt layer, a gluing web or adhesive layer.

10. A multilayer acoustic trim part according to claim 5, wherein the binder fibers are one of a mono-component fiber or bi-component fiber made with at least one of the following materials, polyester, in particularly polyethylene terephthalate, polyolefins, in particularly Polypropylene or polyethylene, polylactic acid (PLA) or polyamide.

11. A multilayer acoustic trim part according to claim 5, wherein the recycling fibers are one of a cotton shoddy, a synthetic shoddy, a polyester shoddy, a natural fiber shoddy, or a mixed synthetic fiber and natural fiber shoddy.

12. A multilayer acoustic trim part according to claim 5, wherein the self-crimped or synthetic fibers are made with at least one of the following materials polyamide (nylon) preferably polyamide 6 or polyamide 6,6, polyester and or its copolymers, preferably polyethylene terephtalate or polybutylene terephtalate, or polyolefin, preferably polypropylene or polyethylene, or made of a polymer and its copolymer, preferably polyethylene terephtalate and its copolymer.

13. A multilayer acoustic trim part according to claim 5, wherein the self-crimped fibers are conjugate fibers made of at least two sides with a difference between the two sides inducing an intrinsic self-crimping of the fiber in a random 3 dimensional form.

14. A multilayer acoustic trim part according to claim 1, further comprising at least one of a covering scrim layer, an acoustic scrim layer, a decorative top layer, for instance a tufted carpet layer or nonwoven carpet layer.

15. Use of the multilayer acoustic trim part according to claim 1, as an interior trim part for instance as an inner-dash, as part of an interior flooring system, or as an inner wheel house lining or as an acoustic cladding, or as an engine bay trim part, for instance a hood liner or outer-dash.

16. Automotive trim part according to claim 2, wherein the air flow resistance of the top layer and the intermediate layer together represents at least 55% of the overall AFR of the multilayer, preferably between 65% and 80% of the overall AFR of the multilayer.

17. Automotive trim part according to claim 2, wherein the AFR of the intermediate film layer is higher than the AFR of the at least two fibrous layers.

18. Automotive trim part according claim 2, wherein at least one of the fibrous layers comprises a mixture of fibers consisting of 10 to 40% by weight of binder fibers, 10 to 70% by weight of recycled fibers and 10 to 70% by weight of self-crimped fibers or synthetic fibers, wherein the total amount of said fibers adds to 100% by weight.

19. Automotive trim part according to claim 2, wherein at least one of the fibrous layers comprises a mixture of fibers consisting of 10 to 40% by weight of binder fibers, 10 to 70% by weight of recycled fibers, wherein the total amount of said fibers adds to 100% by weight.

20. A multilayer acoustic trim part according to claim 2, wherein the air permeable intermediate film layer is one of a single layer film or a multilayer film.

21. A multilayer acoustic trim part according claim 7, wherein the film is made with at least one of the following polymers: copolymer or polymer of acetate, like Ethylene Vinyl Acetate (EVA), copolymers of acrylate for instance Ethylene Acrylic Acid (EAA), a polyolefin for instance a polyethylene (PE) based polymer, like linear density polyethylene (LDPE), linear long density polyethylene (LLDPE) or a metallocene linear long density polyethylene (mLL-DPE) or derivatives, or a multilayer film, preferably a combination of a polyethylene based copolymer film covered with an adhesive EAA layer at least at one side.

22. A multilayer acoustic trim part according to claim 2, wherein the film is replaced by one of: a nonwoven scrim, a hot melt layer, a gluing web or adhesive layer.

23. A multilayer acoustic trim part according to claim 18, wherein the binder fibers are one of a mono-component fiber or bi-component fiber made with at least one of the following materials, polyester, in particularly polyethylene terephthalate, polyolefins, in particularly Polypropylene or polyethylene, polylactic acid (PLA) or polyamide.

24. A multilayer acoustic trim part according to claim 18, wherein the recycling fibers are one of a cotton shoddy, a synthetic shoddy, a polyester shoddy, a natural fiber shoddy, or a mixed synthetic fiber and natural fiber shoddy.

25. A multilayer acoustic trim part according to claim 18, wherein the self-crimped or synthetic fibers are made with at least one of the following materials polyamide (nylon) preferably polyamide 6 or polyamide 6,6, polyester and or its copolymers, preferably polyethylene terephtalate or polybutylene terephtalate, or polyolefin, preferably polypropylene or polyethylene, or made of a polymer and its copolymer, preferably polyethylene terephtalate and its copolymer.

26. A multilayer acoustic trim part according to claim 18, wherein the self-crimped fibers are conjugate fibers made of at least two sides with a difference between the two sides inducing an intrinsic self-crimping of the fiber in a random 3 dimensional form.

27. A multilayer acoustic trim part according to claim 2, further comprising at least one of a covering scrim layer, an acoustic scrim layer, a decorative top layer, for instance a tufted carpet layer or nonwoven carpet layer.

28. Use of the multilayer acoustic trim part according to claim 2, as an interior trim part for instance as an inner-dash, as part of an interior flooring system, or as an inner wheel house lining or as an acoustic cladding, or as an engine bay trim part, for instance a hood liner or outer-dash.

29. A multilayer acoustic trim part according to claim 1, wherein the entirety of the trim part is air permeable.

* * * * *